United States Patent [19]
Doerhoefer

[11] 3,852,445
[45] Dec. 3, 1974

[54] [CNS COMPOSITIONS AND METHOD WITH 4-(5,10-DIHYDRO-4H-BENZO[5,6]CYCLOHEPTA[1,2-B]THIENYL-4-YL)-1-PIPERAZINYL-ALKYL]-3-ALKYL-2-IMIDAZOLIDINONES

[75] Inventor: Guenther Doerhoefer, Allschwil, Switzerland

[73] Assignee: Ciba-Geigy Corporation, Ardsley, N.Y.

[22] Filed: July 5, 1973

[21] Appl. No.: 376,759

Related U.S. Application Data

[62] Division of Ser. No. 260,877, June 8, 1972.

[30] Foreign Application Priority Data
June 17, 1971 Switzerland.................. 8822/71

[52] U.S. Cl. ................................................ 424/250
[51] Int. Cl............................................... A61k 27/00

[58] Field of Search ................................... 424/250

*Primary Examiner*—Stanley J. Friedman
*Attorney, Agent, or Firm*—Joseph G. Kolodny; Ronald A. Daignault

[57] ABSTRACT

Compounds of the class of [4-(5,10-dihydro-4H-benzo[5,6]cyclohepta[1,2-b]thien-4-yl)-1-piperzinyl-alkyl]-3-alkyl-2-imidazolidinones, their 5-methyl substituted and their 7-chloro- or 8-chloro-substituted derivatives as well, as their pharmaceutically acceptable acid addition salts exhibit pharmacological activities directed to the central nervous system as it is shown by standard pharmacological test methods on animals. The results obtained render these compounds suitable for use as sedatives, hypnotics and tranquilizers for the treatment of sleep disturbances and states of tension and agitation.

4 Claims, No Drawings

CNS COMPOSITIONS AND METHOD WITH 4-(5,10-DIHYDRO-4H-BENZO[5,6]CYCLOHEPTA[1,2-B]THIENYL-4-YL)-1-PIPERAZINYL-ALKYL]-3-ALKYL-2-IMIDAZOLIDINONES

This is a division of Ser. No. 260,877 filed June 8, 1972.

DETAILED DESCRIPTION

The present invention relates to new imidazolidinone derivatives, to processes for their production, to pharmaceutical compositions containing the new compounds, and to the use thereof.

More particularly, the present invention relates to compounds of the formula I:

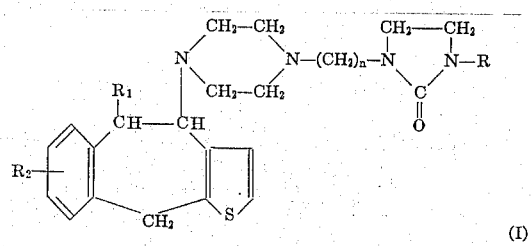

(I)

wherein

R is a lower alkyl group having 1 to 4 carbon atoms, $R_1$ is hydrogen or the methyl group, $R_2$ is hydrogen, halogen up to atomic number 35, trifluoromethyl, a lower alkyl or alkoxy group having 1 to 4 carbon atoms, or a di-lower alkylsulphamoyl group of of which the lower alkyl groups each contain 1 to 4 carbon atoms, and n is 2 or 3, and the pharmaceutically acceptable acid addition salts thereof.

In the compounds of the general formula I, R and, as a lower alkyl group, also $R_2$ is the methyl, ethyl, propyl, isopropyl, butyl, isobutyl, sec.butyl or the tert.butyl group. As a lower alkoxy group, $R_2$ is, e.g. the methoxy, ethoxy, propoxy, isopropoxy, butoxy or the isobutoxy group; and as a di-lower alkyl sulphamoyl group, it is, e.g. the dimethylsulphamoyl, diethylsulphamoyl or the dibutylsulphamoyl group.

Preferred members of this class are:
1. 1-[2-[4-(5,10-dihydro-4H-benzo[5,6]cyclohepta[1,2-b]thien-4-yl)-1-piperazinyl]-ethyl]-3-methyl-2-imidazolidinone,
2. 1-[2-[4-(5,10-dihydro-4H-benzo[5,6]cyclohepta[1,2-b]thien-4-yl)-1-piperazinyl]-ethyl]-3-isopropyl-2-imidazolidinone,
3. 1-[2-[4-(5,10-dihydro-4H-benzo[5,6]cyclohepta[1,2-b]thien-4-yl)-1-piperazinyl]-ethyl]-3-butyl-2-imidazolidinone,
4. 1-[3-[4-(5,10-dihydro-4H-benzo[5,6]cyclohepta[1,2-b]thien-4-yl)-1-piperazinyl]-propyl]-3-methyl-2-imidazolidinone,
5. 1-[3-[4-(5,10-dihydro-4H-benzo[5,6]cyclohepta[1,2-b]thien-4-yl)-1-piperazinyl]-propyl]-3-butyl-2-imidazolidinone,
6. 1-[2-[4-(5,10-dihydro-5-methyl-4H-benzo[5,6]cyclohepta[1,2-b]thien-4-yl)-1-piperazinyl]-ethyl]-3-methyl-2-imidazolidinone,
7. 1-[3-[4-(5,10-dihydro-5-methyl-4H-benzo[5,6]cyclohepta[1,2-b]thien-4-yl)-1-piperazinyl]-3-butyl-2-imidazolidinone,
8. 1-[2-[8-chloro-4-(5,10-dihydro-4H-benzo[5,6]cyclohepta[1,2-b]thien-4-yl)-1-piperazinyl]-ethyl]-3-methyl-2-imidazolidinone,
9. 1-[3-[8-chloro-4-(5,10-dihydro-4H-benzo[5,6]cyclohepta[1,2-b]thien-4-yl)-1-piperazinyl]-propyl]-3-methyl-2-imidazolidinone,
10. 1-[2-[7-chloro-4-(5,10-dihydro-4H-benzo[5,6]cyclohepta[1,2-b]thien-4-yl)-1-piperazinyl]-ethyl]-3-methyl-2-imidazolidinone,
11. 1-[3-[7-chloro-4-(5,10-dihydro-4H-benzo[5,6]cyclohepta[1,2-b]thien-4-yl)-1-piperazinyl]-propyl]-3-methyl-2-imidazolidinone, and the pharmaceutically acceptable acid addition salts thereof. Compounds of the formula I and the pharmaceutically acceptable acid addition salts thereof have valuable pharmacological properties and a high therapeutic index. In the case of oral, rectal or parental administration, they have a central depressant action; e.g., they have an anaesthesia-inducing action, i.e. an hypnotic effect, potentiate the action of anaesthetics, and have a muscle-relaxing action. These properties, which are determined by selected standard tests [cp. M.J. Thuillier and R. Domenjoz: 'Der Anasthesist' (The Anaesthetist) 6, 163 (1957), R. Domenjoz and W. Theobald: Arch.int. Pharmacodyn. 120, 450 (1959) and W. Theobald et al.: Arzneimittelforsch. 17, 561 (1967)] render these compounds suitable for use as sedatives, hypnotics and tranquilisers for the treatment of sleep disturbances and conditions of tension and agitation.

The test results indicated in the following table are illustrative, and illustrative only of the pharmaceutical activity of the subject compounds. The compounds 1 to 5 in the table are the compounds 1 to 5 listed above, compounds 1 to 3 and 5 being for the purposes of testing in the form of their dimethanesulphonate salts and compound 4 in the form of its monomethanesulphonate salt.

Table

| Compound No. | 50% decrease of orientation motility after i.p. administration on mice; dose in mg/kg: | Prolongation of anesthesia induced by s.c. application of 40 mg/kg of 4-allyl-2-methoxy-phenoxyacetic acid diethylamide on mice 30 minutes after s.c. application of the test compound: dose in mg/kg | prolongation of anesthesia in percent | Adrenolytic activity on isolated organ (guinea-pig); equipotent dose in comparison with Phentolamine-methane-sulphonate = 1 (REGITIN) |
|---|---|---|---|---|
| 1 | 0.52 | 1.0 | + 111 | |
| | | 50.0 | + 1070 | 0.05 : 1 |
| 2 | | 5.0 | + 827 | |
| | | 50.0 | + 879 | 0.06 : 1 |
| 3 | | 5.0 | + 540 | |
| | | 50.0 | + 848 | 1 : 1 |
| 4 | 0.38 | 50.0 | + 1070 | 0.03 : 1 |
| 5 | | 50.0 | + 573 | 0.2 : 1 |

A compound of the formula I is produced according to the invention by the reaction of a compound of the formula II

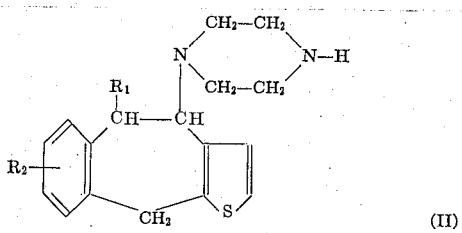

wherein $R_1$ and $R_2$ have the meanings given under formula I, or of an alkali metal derivative of such a compound, with a reactive ester of a compound of the formula III

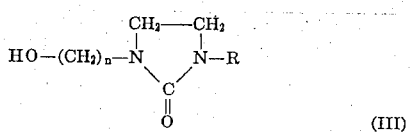

wherein R and *n* have the meanings given under formula I; and, optionally, the conversion of the reaction product with an inorganic or organic acid into a pharmaceutically acceptable addition salt.

Suitable reactive esters of compounds of the formula III are, for example, halides such as chlorides or bromides, also sulphonic acid esters, e.g. the methane sulphonic acid esters, or the o- or p-toluenesulphonic acid esters.

These esters are reacted with the free bases of formula II preferably in the presence of a solvent. Suitable solvents are those which are inert under the reaction conditions, e.g. hydrocarbons such as benzene, toluene or xylene, halogenated hydrocarbons such as chloroform, ethereal liquids such as ether or dioxane, as well as lower alkanones such as acetone, methyl ethyl ketone or diethyl ketone. The reaction temperatures are between ca. 50° and 150°C, preferably at the boiling point of the employed solvent.

In the reaction according to the invention between one molecular equivalent of reactive ester and one molecular equivalent of free base, one molecular equivalent of acid is eliminated. This acid can be bound to excess base of the formula II, or to the dibasic reaction product. Preferably, however, an acid-binding agent is added to the reaction mixture. Suitable acid-binding agents are, for example, alkali metal carbonates such as sodium or potassium carbonate, also tertiary organic bases such as, e.g., pyridine, triethylamine or N,N-diisopropylethylamine. It is also possible to use excess tertiary bases as solvent.

If, instead of the free base of the formula II in the reaction according to the invention, an alkali metal derivative of such a compound is used, e.g. a sodium, potassium or lithium derivative, then it is advantageous to perform the reaction in a hydrocarbon, e.g. in benzene or in toluene.

The formation of the alkali metal derivatives of the first reactant is effected preferably in situ, e.g. by the addition of at least one molecular equivalent of alkali metal hydride, alkali metal amide, or of an alkali metal organic compound, when initially one molecular equivalent of free base is used. For example, sodium and lithium amide are used as alkali metal amides; sodium hydride as alkali metal hydride; and phenyl lithium or butyl lithium as an alkali metal organic compound.

Of the starting materials of the formula II, the compound wherein $R_1$ and $R_2$ represent hydrogen is described in the literature [cp. M. Rajsner et al., Coll. Czechoslov. Chem. Commun. 34, 468 (1969)].

The corresponding compound of the formula II wherein $R_1$ represents the methyl group, and $R_2$ hydrogen, can be produced in the following manner:

The [o-(2-thenyl)-phenyl]-acetonitrile known from the cited reference is reacted with diethyl carbonate and sodium to the corresponding α-ethoxycarbonyl derivative; from the sodium compound of this is then obtained, by condensation with methyl iodide and subsequent partial alkaline hydrolysis, o-(2-thenyl)-hydratropanitrile. This is saponified with alcoholic potassium hydroxide solution to the corresponding o-(2-thenyl)-hydratropic acid, and this reacted with thionyl chloride to the corresponding acid chloride, which is condensed by means of tin tetrachloride to obtain 5,10-dihydro-5-methyl-4H-benzo[5,6]cyclohepta[1,2-b]thiophen-4-one. Reduction with sodium borohydride produces the corresponding alcohol which, by reaction with anhydrous hydrogen chloride dissolved in benzene, yields 4-chloro-5,10-dihydro-5-methyl-4H-benzo[5,6]cyclohepta[1,2-b]thiophene, from which is then obtained, by reaction with 1-piperazinecarboxylic acid ethyl ester and subsequent alkaline saponification, 1-(5,10-dihydro-5-methyl-4H-benzo[5,6]cyclohepta[1,2-b]thien-4-yl)-piperazine.

Further starting materials corresponding to the formula II are, for example, compounds in which $R_1$ stands for hydrogen, and $R_2$ represents a 7-chlorine or an 8-chlorine atom. Such compounds can be produced, for example, in the following manner:

A mixture consisting of the magnesium salts of 4-chloro- and 5-chloro-2-(2-thenoyl)-benzoic acids is produced, in a known manner [cp. V. Weinmayr, JACS 74, 4353–4357 (1952)], from 4-chlorophthalic acid anhydride by reaction with a Grignard reagent prepared from 2-bromothiophene and magnesium chips, the said acids being separated by fractionated precipitation, once with acetic acid and then with hydrochloric acid, into the 4-chloro- and 5-chloro-isomers of the acids [cp. loc. cit.]. By reduction with a reagent prepared from zinc dust, ammonia and copper sulphate, the 4-chloro-2-(2-thenoyl)-benzoic acid is converted into the corresponding thenylbenzoic acid, from which is obtained by reduction, e.g. with lithium aluminum hydride, the corresponding benzyl alcohol, and from this, by reaction with phosphorus tribromide in benzene, the corresponding benzyl bromide. This is then converted, by reaction with sodium cyanide in aqueous ethanol, into the corresponding benzyl cyanide, from which is finally obtained, by saponification with alcoholic potassium hydroxide solution, 4-chloro-2-(2-thenyl)-phenylacetic acid, the transformation of which into 4,8-dichloro-4,5-dihydro-10H-benzo[a]- thieno[2,3-d]cycloheptene, and subsequent reaction with 1-piperazinecarboxylic acid ethyl ester followed by alkaline saponification, yields 1-(8-chloro-5,10-dihydro-4H-benzo[5,6]cyclohepta[1,2-b]thien-4-yl)-piperazine, analogously to the procedure previously described. In principally the same manner, the above mentioned 5-chloro-2-(2-thenoyl)-benzoic acid is converted into 4,7-dichloro-4,5-dihydro-10H-benzo[a]thieno[2,3-d]cycloheptene, and this finally into 1-(7-chloro- 5,10-dihydro-4H-benzo[5,6]cyclohepta[1,2-b]thien-4-yl)-piperazine.

The second reactant of the process according to the invention consists of the reactive esters of compounds of the formula III. Of these compounds, 1-(2-chloroethyl)- and 1-(3-chloropropyl)-3-methyl-2-imidazolidinone, as well as 1-(2-chloroethyl)-3-butyl-2-imidazolidinone, are, for example, known, and can be produced by various processes. Further compounds of this type can be produced analogously.

By application of a second process according to the invention, compounds of the formula I of which the symbol $n$ equals 2 are produced by the reaction of a compound of the formula II, or of an alkali metal derivative of such a compound, with a compound of the formula IV

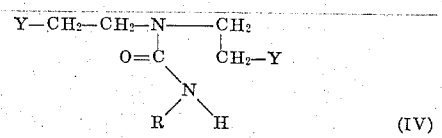

(IV)

wherein
Y represents halogen,
and R has the meaning defined under formula I, or with an alkali metal derivative of such a compound; and, optionally, the conversion of the reaction product with an inorganic or organic acid into an addition salt.

The radical Y of the formula IV is, as halogen, preferably chlorine or bromine.

The reaction according to the invention of the free bases of the formula II, or of their alkali metal derivatives, with the urea derivatives, or with their alkali metal derivatives, can be performed in the same solvents or diluents, and at the same temperatures, as in the first process. With the reaction of one molecular equivalent of free base with one molecular equivalent of free urea derivative, two molecular equivalents of hydrogen halide are split off, which can also be bound to the same acid-binding agents. Both reactants can moreover be introduced as alkali metal derivatives, e.g. as sodium, potassium or lithium derivatives, into the process according to the invention. These alkali metal derivatives can be obtained analogously to the alkali metal derivatives of the first process; they are preferably produced in situ.

A starting material which is embraced by the formula IV is 1-methyl-3,3-bis-(2-chloroethyl)-urea, which can be obtained, for example, starting with diethanolamine. Diethanolamine yields, with 1-methylisocyanate, 1-methyl-3,3-bis-(2-hydroxyethyl)-urea, which reacts with thionyl chloride with elimination of sulphur dioxide and hydrogen chloride. Further starting materials of the formula IV can be produced analogously.

In a third process according to the invention, a reactive ester of a compound of the formula V:

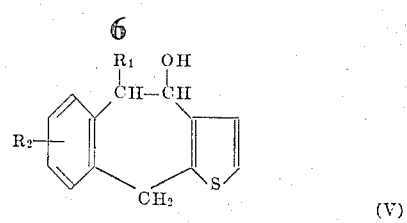

(V)

wherein $R_1$ and $R_2$ have the meanings given under formula I is reacted with a compound of the formula V:

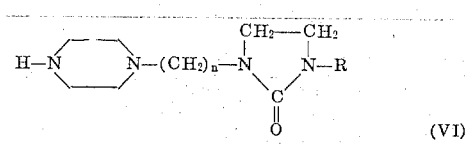

(VI)

wherein R and $n$ have the meanings given under formula I, or with an alkali metal derivative of such a compound; and, optionally, the obtained reaction product converted with an inorganic or organic acid into an addition salt.

Suitable reactive esters of compounds of the formula V are, e.g. halides such as chlorides or bromides, also sulphonic acid esters such as the methanesulphonic acid ester, the o- or p-toluenesulphonic acid ester, or the o-chloro- or p-chlorobenzenesulphonic acid ester.

The reaction according to the invention of the free bases, or of their alkali metal derivatives, with the reactive esters can be performed in the same solvents or diluents, and at the same reaction temperatures, as in the first process. With the reaction of one molecular equivalent of free base with one molecular equivalent of reactive ester, one molecular equivalent of acid is split off, which can be bound to the same acid-binding agents as in the first process.

Instead of the free bases, it is also possible to use their alkali metal derivatives, e.g. sodium, potassium or lithium derivatives, preferably in situ, in the process according to the invention. These alkali metal derivatives can be obtained analogously to the alkali metal derivatives of the first process.

A reactive ester of a compound of the formula V required as starting material, 4-chloro-5,10-dihydro-4H-benzo[5,6]cyclohepta[1,2-b]thiophene, is described in the cited literature. The preparation of the corresponding 5-methyl compound is described in conjunction with the first process. Further reactive esters of this type can be produced according to the data previously given, in a manner known per se.

Further representative compounds of the formula VI which are known are, e.g.: 1-[2-(1-piperazinyl)-ethyl]-3-methyl-2-imidazolidinone, 1-[3-(1-piperazinyl)-propyl]-3-methyl-2-imidazolidinone, as well as the corresponding 3-ethyl compounds; they can be produced by various processes. Other compounds of this type can be produced in an analogous manner.

A fourth process according to the invention comprises the reaction of a compound of the formula VII

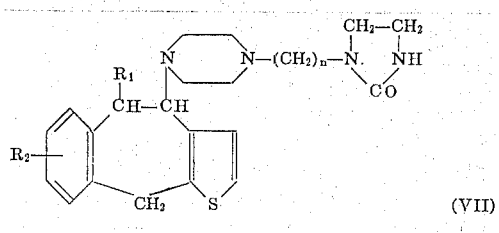

(VII)

wherein $R_1$, $R_2$ and $n$ have the meanings given under formula I, in the presence of an acid-binding agent, or of an alkali metal derivative of such a compound, with a reactive ester of a compound of the formula VIII $$HO - R \quad \text{(VIII)}$$

wherein R has the meaning given under formula I; and, optionally the conversion of the obtained reaction product with an inorganic or organic acid into an addition salt.

The reactions according to the process are performed at elevated temperature, preferably between ca. 60° and 120°C, or the boiling temperature of the reaction medium where this is lower, in an inert organic solvent.

Suitable acid-binding agents are, in particular, basically reacting alkali metal salts such as, e.g. potassium or sodium carbonate. With regard to suitable alkali metal compounds of starting materials of the formula VII, use is made, in particular, of the lithium or sodium compounds produced, e.g. in situ by reaction with lithium amide, sodium hydride or sodium amide.

Suitable inert organic solvents are, for example, aliphatic, cycloaliphatic or aromatic hydrocarbons, such as hexane, cyclohexane, decahydronaphthalene, benzene or toluene; or ethereal solvents such as diethyl ether, dibutyl ether, tetrahydrofuran, dioxane or anisole; and with use of acid-binding agents, such as, e.g. alkali metal carbonates, also ketones, or lower alkanols such as, e.g. acetone, methyl ethyl ketone, or methanol or ethanol.

The starting materials of the general formula VII are, for their part, new substances. They can be obtained, for example, by the reaction of compounds of the above given formula II, wherein $R_1$ and $R_2$ have the meaning defined there, with 2-(2-chloroethyl)- or 2-(3-chloropropyl)-2-imidazolidinone, analogously to the first-mentioned process for production of the compounds of the general formula I. 2-(2-Chloroethyl)-2-imidazolidinone is described in the U.S. Pat. No. 2,787,169; the (3-chloropropyl)-compound can be produced analogously.

Suitable reactive esters of compounds of the formula VIII are, in particular, their hydrohalic acid esters, e.g. bromides and iodides, as well as, optionally with carrying out of the reaction in a closed vessel, chlorides. Further suitable esters are sulphonic acid esters, e.g. arenesulphonic acid esters such as p-toluenesulphonic acid ester, or alkanesulphonic acid esters such as methanesulphonic acid ester, and also sulphuric acid esters, particularly dimethylsulphate and diethylsulphate.

A fifth process according to the invention comprises the reaction of a reactive ester of a compound of the formula IX

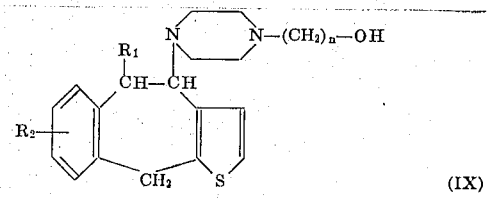

(IX)

wherein $R_1$, $R_2$ and $n$ have the meanings given under formula I, with a compound of the formula X

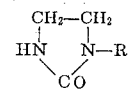

(X)

wherein R has the meaning given under formula I, in the presence of an acid-binding agent, or with an alkali metal derivative of such a compound; and, optionally, the conversion of the obtained reaction product with an inorganic or organic acid into an addition salt.

The reactions are preferably performed in the manner described for the fourth-mentioned process, and in the solvents mentioned there.

Suitable reactive esters of compounds of the formula IX are, e.g. hydrohalic acid esters, especially chlorides, and sulphonic acid esters, e.g. arenesulphonic acid esters such as p-toluenesulphonic acid ester, or alkanesulphonic acid esters such as methanesulphonic acid ester. The reactive esters are obtained from the compounds of the formula IX in a manner known per se; e.g., the chlorides by heating with thionyl chloride. The compounds of the formula IX are, for their part, obtainable, e.g. by reaction of reactive esters of compounds of the above given formula V, wherein $R_1$ and $R_2$ have the meanings given under formula I, with 1-piperazineethanol or 1-piperazinepropanol, analogously to the third-mentioned process for the production of compounds of the formula I. Of the starting materials of the formula X, some are known and others can be produced in an analogous manner to that for obtaining the known starting materials.

The compounds of the formula I obtained by the processes according to the invention are then optionally converted, in the usual manner, into their addition salts with inorganic and organic acids. For example, the acid desired as salt component, or a solution of the acid, is added to a solution of a compound of the formula I in an organic solvent. Organic solvents are preferably chosen for the reaction in which solvents the formed salt is difficulty soluble, so that it may by separated by filtration. Such solvents or solvent mixtures are, e.g. methanol, acetone, methyl ethyl ketone, acetone/ethanol, methanol/ether or ethanol/ether.

It is possible to use as pharmaceutical compositions, instead of free bases, pharmaceutically acceptable acid addition salts, i.e. salts with such acids of which the anions are not toxic in the case of the dosage amounts in question. Moreover, it is of advantage if the salts to be used as pharmaceutical compositions crystallise well and are not, or only slightly, hygroscopic. The following may be used, for example, for salt formation with compounds of the formula I: hydrochloric acid, hydrobromic acid, sulphuric acid, phosphoric acid, methanesulphonic acid, ethanesulphonic acid, 2-hydroxyethanesulphonic acid, acetic acid, malic acid, tartaric acid, citric acid, lactic acid, oxalic acid, succinic acid, fumaric acid, maleic acid, benzoic acid, salicyclic acid, phenylacetic acid, mandelic acid and embonic acid.

As already mentioned, the new active substances are administered orally, rectally or parenterally. The dosage amount depends on the mode of administration, on the species, on the age and on the individual condition. The daily doses of the free bases, or of pharmaceutically acceptable salts thereof, vary between 0.1 mg/kg and 10 mg/kg for warm-blooded animals. Suitable dosage units, such as dragees, tablets, suppositories or ampoules, preferably contain 5–200 mg of an active substance according to the invention.

Dosage units for oral administration contain as active substance preferably between 10 and 90 percent of a compound of the general formula I, or of a pharmaceutically acceptable salt thereof. The said dosage units are prepared by the combination of the active substance with, e.g. solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragée cores. The dragée cores are coated, for example, with concentrated sugar solutions which may also contain, e.g. gum arabic, talcum and/or titanium dioxide; or with a lacquer dissolved in readily volatile organic solvents or solvent mixtures. Dyestuffs can be added to these coatings in order to facilitate, for example, identification of the various doses of active substance.

Other suitable oral dosage units are hard gelatine capsules, as well as soft closed capsules made from gelatine and a softener, such as glycerin. The hard capsules contain the active substance preferably as a granulate, this being, e.g. in admixture with fillers such as maize starch, and or lubricants such as talcum or magnesium stearate, and optionally stabilisers such as sodium metabisulphite ($Na_2S_2O_5$) or ascorbic acid. In soft capsules, the active substance is preferably dissolved or suspended in suitable liquids such as polyethylene glycols, to which likewise stabilisers may be added.

Suitable dosage units for rectal administration are, e.g. suppositories consisting of a combination of an active substance and a suppository foundation substance. The following are, for example, suitable as base substances: natural or synthetic triglycerides, paraffin hydrocarbons, polyethylene glycols or higher alkanols. Hard gelatine capsules consisting of a combination of the active substance and a foundation substance are likewise suitable. Suitable foundation substances are, e.g. liquid triglycerides, polyethylene glycols or paraffin hydrocarbons.

Ampoules for parenteral administration, particularly for intramuscular administration, preferably contain a water-soluble salt of an active substance in a concentration of preferably 0.5 to 5 percent, optionally together with suitable stabilisers and buffer substances, in aqueous solution.

The following specifications further illustrate the production of tablets, dragées, capsules, suppositories and ampoules:

a. An amount of 250 g of 1-[2-[2-[4-(5,10-dihydro-4H-benzo[5,6]cyclohepta[1,2-b]thien-4-yl)-1-piperazinyl]-ethyl]-3-methyl-2-imidazolidinone is mixed with 175.80 g of lactose and 169.70 g of potato starch; the mixture is moistened with an alcoholic solution of 10 g of stearic acid, and then granulated through a sieve. After the granulate has dried, the following ingredients are mixed in: 160 g of potato starch, 200 g of talcum, 2.50 g of magnesium stearate and 32 g of colloidal silicon dioxide; the mixture is subsequently pressed to obtain 10,000 tablets each weighing 100 mg and each containing 25 mg of active substance; the tablets may optionally be provided with grooves to render possible a more precise adjustment of the dosage.

b. A granulate is produced from 250 g of 1-[2-[4-(5,10-dihydro-4H-benzo[5,6]cyclohepta[1,2-b]thien-4-yl)-1-piperazinyl]-ethyl]-3-isopropyl-2-imidazolidinone, 175.90 g of lactose, and the alcoholic solution of 10 g of stearic acid; after drying, the granulate is mixed with 56.60 g of colloidal silicon dioxide, 165 g of talcum, 20 g of potato starch and 2.50 g of magnesium stearate; and the mixture finally pressed out to obtain 10,000 dragée cores. These are subsequently coated with a concentrated syrup made from 502.28 g of crystallised saccharose, 6 g of shellac, 10 g of gum arabic, 0.22 g of dyestuff and 1.5 g of titanium dioxide, the thus coated dragée cores being afterwards dried. The obtained dragées each weigh 120 mg and each contain 25 mg of active substance.

c. To produce 1,000 capsules each containing 25 mg of active substance, an amount of 25 g of 1-[3-[4-(5,10-dihydro-4H-benzo[5,6]cyclohepta[1,2-b]thien-4-yl)-1-piperazinyl]-propyl]-3-methyl-2-imidazolidinone is mixed with 248.0 g of lactose; the mixture is uniformly moistened with an aqueous solution of 2.0 g of gelatine, and then granulated through a suitable sieve (e.g. Sieve III, according to Ph.Helv. V). The granulate is mixed with 10.0 g of dried maize starch and 15.0 g of talcum, and the mixture evenly filled into 1000 hard gelatine capsules, size 1.

d. A suppository foundation substance is prepared from 2.5 g of 1-[3-[4-(5,10-dihydro-4H-benzo[5,6]cyclohepta [1,2-b]thien-4-yl)-1-piperazinyl]-propyl]-3-butyl-2-imidazolidinone and 167.5 g of adeps solidus; from the prepared substance are then poured 100 suppositories each containing 25 mg of active substance.

e. A solution of 25 g of 1-[2-[4-(5,10-dihydro-4H-benzo [5,6]cyclohepta[1,2-b]thien-4-yl)-1-piperazinyl]-ethyl]-3-methyl-2-imidazolidinone-dimethanesulphonate in one litre of water is filled into 1000 ampoules, and then sterilised. An ampoule contains a 2.5 percent solution of 25 mg of active substance The following examples further illustrate the production of the new compounds of the formula I; the examples do not, however, in any way limit the scope of the invention. Temperatures are expressed in degrees Centigrade.

EXAMPLE 1

A solution of 30 g (0.14 mole) of 1-[2-(1-piperazinyl)-ethyl]-3-methyl-2-imidazolidinone in 50 ml of abs. benzene is added dropwise at 25° within 30 minutes, with stirring, to a solution of 16 g (0.07 mole) of 4-chloro-5,10-dihydro-4H-benzo[5,6]cyclohepta[1,2-b] thiophene in 100 ml of abs. benzene. The reaction mixture is subsequently stirred for 15 hours at room temperature, and the refluxed for a further 2 hours. The cooled solution is poured on 200 g of ice, and the whole made alkaline by the addition of 35 ml of 2-n.sodium hydroxide solution. The organic phase is separated; it is then washed with water until neutral, and afterwards repeatedly extracted with a 1-n.methanesulphonic acid solution. The combined extracts are rendered alkaline with 2-n.sodium hydroxide solution, and the mixture extracted with methylene chloride. The combined organic extracts are washed with water until neutral, and afterwards dried. After removal of the solvent by evaporation in vacuo, there remains an oil which solidifies after the addition of acetone. After recrystallisation from acetone, pure 1-[2-[4-(5,10-dihydro-4H-benzo[5,6]cyclohepta[1,2-thien-4-yl)-1-piperazinyl]-ethyl]-3-methyl-2-imidazolidinone is obtained, M.P. 159°–160°.

An amount of 8.75 g (0.021 mole) of the obtained base is dissolved in a mixture of 150 ml of acetone and 50 ml of methanol; the solution is cooled to 10° and an addition then made to the solution of 4.1 g (0.042 mole) of methanesulphonic acid. The salt which has crystallised out is filtered off under suction, and recrystallised from ethanol to obtain the pure dimethanesulphonate of the base; M.P.: 192°–193°.

EXAMPLE 2

The following final products are obtained in an analogous manner to that described in Example 1:

a. from 16 g of 4-chloro-5,10-dihydro-4H-benzo[5,6]cyclohepta[1,2-b]thiophene and 34 g of 1-[2-(1-piperazinyl)-ethyl]-3-isopropyl-2-imidazolidinone: 1-[2-[4-(5,10-dihydro-4H-benzo[5,6]cyclohepta[1,2-b]thien-4-yl)-1-piperazinyl]-ethyl]-3-isopropyl-2-imidazolidinone, which is recrystallised from acetone, M.P.: 118°–120°;

from 3.1 g of the base and 1.33 g of methanesulphonic acid: the dimethane sulphonate, which is recrystallised from acetone/ether, M.P.: 187°–189°;

b. from the same amount of starting material and 35.5 g of 1-[2-(1-piperazinyl)-ethyl]-3-butyl-2-imidazolidinone: 1-[2-[4-(5,10-dihydro-4H-benzo[5,6-]cyclohepta[1,2-b] thien-4-yl)-1-piperazinyl]-ethyl]-3-butyl-2-imidazolidinone, which is recrystallised from ligroin, M.P.: 120°–121°;

from 7 g of the base and 3 g of methanesulphonic acid: the dimethane sulphonate, which is recrystallised from acetone/ether, M.P.: 139°–141°;

c. from 21.7 g of the same starting material and 41.7 g of 1-[3-(1-piperazinyl)-propyl]-3-methyl-2-imidazolidinone: 1-[3-[4-(5,10-dihydro-4H-benzo[5,6]cyclohepta[1,2-b]thien-4-yl)-1-piperazinyl]-propyl]-3-methyl-2-imidazolidinone, which is obtained as an oily crude product;

from 15 g of the base and 6.7 g of methanesulphonic acid: the monomethanesulphonate, which is recrystallised from acetone, M.P. 150°–153°;

d. from 25 g of the same starting material and 49.5 g pf 1-[3-(1-piperazinyl)-propyl]-3-butyl-2-imidazolidinone: 1-[3-[4-(5,10-dihydro-4H-benzo[5,6-]cyclohepta[1,2-b] thien-4-yl)-1-piperazinyl]-propyl]-3-butyl-2-imidazolidinone, which is obtained as an oily crude product;

from 18 g of the base and 7.5 g of methanesulphonic acid: the dimethanesulphonate, which is recrystallised from acetone/ether, M.P.: 145°–147°.

EXAMPLE 3

The following final products are obtained by a procedure analogous to that described in Example 1:

a. from 16.2 g of 4-chloro-5,10-dihydro-5-methyl-4H-benzo[5.6]cyclohepta[1,2-b]thiophene and 27.7 g of 1-[2-(1-piperazinyl)-ethyl]-3-methyl-2-imidazolidinone: 1-[2-[4-(5,10-dihydro-5-methyl-4H-benzo[5,6]cyclohepta]thien-4-yl)-1-piperazinyl]-ethyl]-3-methyl-2-imidazolidinone, which is obtained as an oily crude product;

from 12 g of the base and 5.6 ml of 5-n.ethanolic hydrochloric acid: the monohydrochloride, which is recrystallised from acetone, M.P.: 161°–164°;

b. from 21.6 g of 4-chloro-5,10-dihydro-5-methyl-4H-benzo-[5,6]cyclohepta[1,2-b]thiophene and 44.2 g of 1-[3-(1-piperazinyl)-propyl]-3-butyl-2-imidazolidinone: 1-[3-[4-(5,10-dihydro-5-methyl-4H-benzo[5,6]cyclohepta [1,2-b]thien-4-yl)-1-piperazinyl]-propyl]-3-butyl-2-imidazolidinone, which is obtained as an oily crude product;

from 15 g of the base and 6.2 ml of 5-n.ethanolic hydrochloric acid: the monohydrochloride, which is recrystallised from acetone, M.P.: 166°–169°.

The 4-chloro-5,10-dihydro-5-methyl-4H-benzo[5,6]cyclohepta[1,2-b]thiophene required as starting material is produced as follows:

c. An amount of 16.5 g of sodium (0.72 mole) is introduced at 100° in the course of 50 minutes, with stirring, into 850 ml of diethyl carbonate; a solution of 149 g (0.7 mole) of [o-(2-thenyl)-phenylacetonitrile [cp. M. Rajsner et al. Coll. Czechoslov. Chem. Commun. Vol. 34, 468 (1969)] in 200 ml of diethyl carbonate is then added dropwise at 100° to the reaction mixture, and stirring continued for a further 2 hours at 100°. The ethanol formed during the reaction is distilled off direct from the reaction mixture; the latter is subsequently cooled to room temperature and poured, with stirring, into 1,800 ml of water. The solution is made acid to a congo-red indicator by the addition of conc. hydrochloric acid; the organic phase is then separated, and the aqueous phase repeatedly extracted with ether. The combined organic phases are washed until neutral with water, dried, and the solvent evaporated off in vacuo, whereupon cyano-[o-(2-thenyl)-phenyl]-acetic acid ethyl ester is obtained as oil.

d. An amount of 16.1 g (0.69 mole) of sodium is introduced at room temperature, with stirring, into 850 ml of abs. ethanol; an addition is then made dropwise to the solution, at room temperature, of a solution of 200 g (0.69 mole) of cyano-[o-(2-thenyl)-phenyl]-acetic acid ethyl ester in 850 ml of abs. ethanol, and stirring is continued for a further hour at room temperature. An amount of 65 ml (0.05 mole) of methyl iodide is then added dropwise to the clear solution, and the reaction solution refluxed overnight. After the addition of a solution of 85 g of potassium hydroxide in 700 ml of water to the reaction mixture, refluxing is performed for a further 24 hours, and the ethanol subsequently distilled off direct from the reaction mixture. The latter is then cooled to room temperature, the solution poured on 2,000 g of ice, and extraction repeatedly performed with benzene. The combined organic phases are washed until neutral with water, dried, and concentrated in vacuo. The oily residue is fractionated in high vacuum to obtain o-(2-thenyl)-hydratropanitrile in the form of oil; B.P. 120°/0.003 Torr.

e. A solution of 340 g (6.1 moles) of potassium hydroxide in 450 ml of water is added dropwise at room temperature, with stirring, to a solutin of 227 g (1.0 mole) of o-(2-thenyl)-hydratropanitrile in 980 ml of ethanol, and the reaction solution refluxed overnight.

It is subsequently diluted with 2,000 ml of water, the solution filtered, cooled, and then rendered acid with concentrated hydrochloric acid. The precipitate is filtered of under suction, washed with water until neutral, and dried in a vacuum drying cupboard. Purification is performed by recrystallisation from cyclohexane to obtain pure o-(2-thenyl)-hydratropic acid; M.P. 110°–113°.

f. A solution of 129 g (1.08 moles) of thionyl chloride in 240 ml of benzene is added dropwise at 10°–20°, with stirring and whilst nitrogen is being introduced, to a solution of 265 g (1.08 moles) of o-(2-thenyl)-hydratropic acid in 2,400 ml of abs. benzene. The reaction mixture is subsequently stirred, with the introduction of nitrogen, for 60 minutes at room temperature and for 4 hours at 40°–45°. The solution is allowed to stand overnight, and the solvent then evaporated off under vacuo. The oily o-(2-thenyl)-hydratropic acid chloride remaining as residue is advantageously further processed as a crude product.

g. A solution of 286 g (1.08 moles) of o-(2-thenyl)-hydratropic acid chloride in 960 ml of abs. benzene is added dropwise at 0°–5°, with stirring, to a solution of 120 ml (1.08 moles + 10 percent excess) of tin tetrachloride in 960 ml of abs. benzene. The reaction mixture is subsequently stirred, as nitrogen is being introduced, at room temperature overnight. In further processing, the solution is poured on to a mixture of 4,000 g of ice and 200 ml of conc. hydrochloric acid the mixture is then stirred for 60 minutes and the organic phase separated. The aqueous phase is repeatedly extracted with benzene; the combined organic phases are afterwards washed with 2-n.sodium hydroxide solution, then with water, and dried over potassium carbonate. The solvent is evaporated off in vacuo, the solid residue suspended in 200 ml of ether and thereupon filtered. The filter residue is purified by recrystallisation from ligroin to obtain 5,10-dihydro-5-methyl-4H-benzo[5,6]cyclohepta [1,2-b]thiophen-4-one.

h. An amount of 8.3 g (0.22 mole) of sodium borohydride is introduced in portions within 10 minutes at 30°–35° into a stirred solution of 50 g (0.22 mole) of 5,10-dihydro-5-methyl-4H-benzo[5,6]cyclohepta[1,2-b]thiophen-4-one in 500 ml of ethanol. Stirring is continued at 65°–70° for 1 hour, and the reaction mixture allowed to stand overnight. The solvent is subsequently evaporated off in vacuo; an amount of 500 ml of water is then added to the residue, and the solution exhaustively extracted with chloroform. The combined chloroform phases are dried, and concentrated in vacuo. The residue is recrystallised from isopropanol to obtain pure 5,10-dihydro-5-methyl-4H-benzo[5,6]cyclohepta[1,2-b]thiophen-4-ole; M.P. 127°–129°.

i. Anhydrous hydrogen chloride gas is introduced in the course of one hour at a temperature of 5°–10°, with stirring, into a solution of 25 g (0.106 mole) of 5,10-dihydro-5-methyl-4H-benzo[5,6]cyclohepta[1,2-b]thiophen-4-ole in 100 ml of abs. benzene. An amount of 10 g of powdered calcium chloride is subsequently added to the solution saturated with hydrogen chloride; the suspension is then stirred for 10 minutes, and the solvent afterwards evaporated off in vacuo. The crude 4-chloro-5,10-dihydro-5-methyl-4H-benzo[5,6]cyclohepta [1,2-b]thiophene remaining as residue is advantageously further processed immediately.

EXAMPLE 4

The following final products are obtained analogously to Example 1:

a. from 10.75 g of 4,8-dichloro-5,10-dihydro-4H-benzo [5,6]cyclohepta[1,2-b]thiophene and 23.5 g of 1-[2-(1-piperazinyl)-ethyl]-3-methyl-2-imidazolidinone: 1-[2-[8-chloro-4-(5,10-dihydro-4H-benzo[5,6] cyclohepta [1,2-b]thien-4-yl]-1-piperazinyl]-ethyl]-3-methyl-2-imidazolidinone in the form of the raw product, which is recrystallised from acetone, M.P.: 168°–172°;

from 7.13 g of the base and 3.1 g of methanesulphonic acid: the dimethanesulphonate, which is recrystallised from ethanol/ether, M.P.: 192°–196°;

b. from 10.75 g of 4,8-dichloro-5,10-dihydro-4H-benzo [5,6]cyclohepta[1,2-b]thiophene and 19.8 g of 1-[3-(1-piperazinyl)-propyl]-3-methyl-2-imidazolidinone: 1-[3-[8-chloro-4-(5,10-dihydro-4H-benzo[5,6] cyclohepta [1,2-b]thien-4-yl)-1-piperazinyl]-propyl]-3-methyl-2-imidazolidinone, which is obtained as oil;

from 3.6 g of the oily base and 3.2 ml of 5-n. alcoholic hydrochloric acid: the dihydrochloride, which is recrystallised from ethanol/ether, M.P.: 190°–195°;

The 4,8-dichloro-5,10-dihydro-4H-benzo[5,6]cyclohepta [1,2-b]thiophene required as starting material is produced as follows:

c. An amount of 426 g (5.5 moles, 85 percent) of zinc dust is introduced, with stirring, into a mixture of 800 ml of concentrated ammonia and 400 ml of water; an addition of 16 ml of saturated copper sulphate solution is made and the whole heated to 60°. A solution of 130 g (0.49 mole) of 4-chloro-2-(2-thenoyl)-benzoic acid [cp. V. Weinmayr, JACS 74, 4,353–4,357 (1952)] in 800 ml of ethanol is added dropwise at 60° within 30 minutes, and the solution heated, whilst a weak stream of ammonia is introduced, for 44 hours at 85°–90°. The hot solution is separated from the zinc dust by filtration under suction; the solution is then cooled in an ice-bath to room temperature, and subsequently rendered acid to a congo-red indicator by the addition of concentrated hydrochloric acid. The precipitated acid is filtered off under suction and washed until neutral with water; it is then dried in a vacuum drying cupboard, and afterwards recrystallised from cyclohexane to obtain pure 4-chloro-2-(2-thenyl)-benzoic acid, M.P.: 129°–134°.

d. A solution of 127 g (0.50 mole) of 4-chloro-2-(2-thenyl)-benzoic acid in 1,300 ml of abs. ether is added dropwise at 5°–10°, within 70 minutes, to a stirred suspension of 29 g (0.76 mole) of lithium aluminium hydride in 1,300 ml of abs. ether. Stirring is continued for 1 hour at 5°–10°, and refluxing performed overnight. After cooling of the reaction mixture to 5°–10°, additions are made dropwise of 130 ml of hydrous ether, 80 ml of water and, finally, 900 ml of 15 percent hydrochloric acid. The organic phase is separated, washed with 2-n. sodium hydroxide solution and then with water; the ethereal phase is afterwards dried and concentrated by evaporation. The residue is recrystallised from ligroin to obtain 4-chloro-2-(2-thenyl)-benzyl alcohol, M.P.: 69°–70°.

e. A solution of 117 g (0.43 mole) of phosphorus tribromide in 120 ml of abs. benzene is added dropwise at 0°–10°, with stirring, to a solution of 225 g (0.94 mole) of 4-chloro-2-(2-thenyl)-benzyl alcohol in 1,200 ml of abs. benzene. The reaction solution is stirred overnight at room temperature, and then heated for 1 hour at 50°–55°. It is subsequently cooled to 0°–10°, and an addition made dropwise of 190 ml of water. The organic phase is separated, washed until neutral with water, dried, and concentrated in vacuo. The obtained crude product consisting of 4-chloro-2-(2-thenyl)-benzylbromide is further processed in this form.

f. A solution of 279 g (0.92 mole) of crude 4-chloro-2-(2-thenyl)-benzylbromide in 600 ml of ethanol is added dropwise at 80° through two dropping funnels, with stirring, to a solution of 68 g (1.38 moles) of sodium cyanide in 300 ml of water and 85 ml of ethanol. The solution is subsequently reflexed overnight; it is then cooled to 10°–15° and 700 ml of water added. The reaction mixture is exhaustively extracted with ether, washed neutral with water, dried, and concentrated in vacuo. The residue is fractioned in high vacuum to obtain 4-chloro-2-(2-thenyl)-phenylacetonitrile, B.P.: 146°–148°/0.005 mm Hg; M.P.: 39°–40°.

g. A solution of 195 g (3.4 moles) of potassium hydroxide in 230 ml of water is added dropwise at room temperature, with stirring, to a solution of 192 g (0.77 mole) of 4-chloro-2-(2-thenyl)-phenylacetonitrile in 500 ml of ethanol. The reaction solution is refluxed overnight and then diluted with 2,200 ml of water; active charcoal is added and the warm solution filtered. The cooled filtrate is made acid to a congo-red indicator by addition of conc. hydrochloric acid, and the precipitated acid filtered off under suction; it is then washed until neutral with water and dried. After recrystallisation from ligroin, pure 4-chloro-2-(2-thenyl)-phenylacetic acid, M.P. 106°–108°, is obtained.

h. A solution of 43 g (0.36 mole) of thionyl chloride in 90 ml of abs. benzene is added dropwise at 5°–10°, with stirring and introduction of nitrogen, to a solution of 88 g (0.33 mole) of 4-chloro-2-(2-thenyl)-phenylacetic acid in 870 ml of abs. benzene. The reaction mixture is then stirred, with the introduction of nitrogen, for a further 60 minutes at 40°–45° and overnight at room temperature. The solvent is evaporated off and 4-chloro-2-(2-thenyl)-phenylacetic acid chloride obtained as an oily residue, which is advantageously further processed.

i. Analogously to Example 3 (g), the following is obtained from 99.5 g (0.33 mole) of 4-chloro-2-(2-thenyl)-phenylacetic acid chloride, 92 g (0.35 mole) of tin tetrachloride and 400 ml of abs. benzene: 8-chloro-5,10-dihydro-4H-benzo[5,6]cyclohepta[1,2-b]thiophen-4-one, which is recrystallised from isopropanol, M.P.: 152°–154°.

k. Analogously to Example 3 (h), the following is obtained from 27.5 g (0.11 mole) of 8-chloro-4,5-dihydro-10H-benzo[a]thieno[2,3-d]cyclohepten-4-one and 4.0 g (0.105 mole) of sodium borohydride: 8-chloro-5,10-dihydro-4H-benzo[5,6]cyclohepta[1,2-b]thiophen-4-ol, which is recrystallised from benzene/petroleum ether, M.P. 106°–108°.

l. Analogously to Example 3 (i), an oil is obtained from 10 g (0.039 mole) of 8-chloro-4,5-dihydro-10H-benzo[a]thieno[2,3-d]cyclohepten-4-ol by saturation with hydrogen chloride gas; the obtained oil, consisting of 4,8-dichloro-5,10-dihydro-4H-benzo[5,6]cyclohepta[1,2-b]thiophene, is advantageously quickly further processed as crude product.

EXAMPLE 5

The following final products are obtained analogously to Example 1:

a. from 5.37 g of 4,7-dichloro-5,10-dihydro-4H-benzo[5,6]cyclohepta[1,2-b]thiophene and 9.9 g of 1-[3-(1-piperazinyl)-propyl]-3-methyl-2-imidazolidinone: 1-[3-[7-chloro-4-(5,10-dihydro-4H-benzo[5,6]cyclohepta[1,2-b]thien-4-yl)-piperazinyl]-propyl]-3-methyl-2-imidazolidinone, which is obtained as an oily crude product;

from 2.0 g of the base and 1.8 ml of 5-n.alcoholic hydrochloric acid: the dihydrochloride, which is recrystallised from ethanol/ether, M.P.: 155°–158°;

b. from 10.75 g of 4,7-dichloro-5,10-dihydro-4H-benzo[5,6]cyclohepta[1,2-b]thiophene and 23.5 g of 1-[2-(1-piperazinyl)-ethyl]-3-methyl-2 -imidazolidinone: 1-[2-[7-chloro-4-dihydro-4H-benzo[5,6]cyclohepta[1,2-b]thien-4-yl)-1-piperazinyl]-ethyl]-3-methyl-2-imidazolidinone, which is obtained as an oily product;

from 7.7 g of the base and 6.9 ml of 5-n. alcoholic hydrochloric acid: the dihydrochloride, which is recrystallised from isopropanol/ether, M.P.: 150°–153°.

The 4,7-dichloro-5,10-dihydro-4H-benzo[5,6]cyclohepta [1,2-b]thiophene required as starting material is produced as follows:

c. From 130.5 g (0.49 mole) of 5-chloro-2-(2-thenoyl)-benzoic acid, 426 g (5.55 moles, 85 percent) of zinc dust, 16 ml of saturated copper sulphate solution there is obtained, analogously to Example 4 (c), 5-chloro-2-(2-thenyl)-benzoic acid, which is recrystallised from cyclohexane, M.P.: 146°–150°.

d. From 117 g (0.46 mole) of 5-chloro-2-(2-thenyl)-benzoic acid, and 26.8 g (0.71 mole) of lithium aluminium hydride there is obtained, analogously to Example 4 (d), 5-chloro-2-(2-thenyl)-benzyl alcohol, which is further processed as crude product.

e. From 106.5 g (0.44 mole) of 5-chloro-2-(2-thenyl)-benzyl alcohol and 55 g (0.20 mole) of phosphorus tribromide there is obtained, analogously to Example 4 (e), 5-chloro-2-(2-thenyl)-benzyl bromide, which is further processed as crude product.

f. From 134 g (0.45 mole) of 5-chloro-2-(2-thenyl)-benzyl bromide and 33 g (0.67 mole) of sodium cyanide there is obtained, analogously to Example 4 (f), 5-chloro-2-(2-thenyl)-phenylacetonitrile, which is purified by fractionated distillation in high vacuum, B.P.: 139°–142°/0.005 mm Hg.

g. From 93.3 g (0.38 mole) of 5-chloro-2-(2-thenyl)-phenylacetonitrile and 95 g (1.7 moles) of potassium hydroxide there is obtained, analogously to Example 4 (g), 5-chloro-2-(2-thenyl)-phenylacetic acid, which is recrystallised from ligroin, M.P.: 96°–99°.

h. From 10 g (0.037 mole) of 5-chloro-2-(2-thenyl)-phenylacetic acid and 4.85 g (0.04 mole) of thionyl chloride there is obtained, analogously to Example 4 (h), 5-chloro-2-(2-thenyl)-phenylacetic acid chloride, which is further processed as crude product.

i. From 11.3 g (0.037 mole) of 5-chloro-2-(2-thenyl)-phenylacetic acid chloride and 10.5 g (0.04 mole) of tin tetrachloride there is obtained, analogously to Example 3(g), crude 7-chloro-5,10-dihydro-4H-benzo[5,6]cyclohepta[1,2-b]thiophen-4-one, which is recrystallised from isopropanol, M.P. 120°–121°.

k. From 40.0 g (0.161 mole) of 7-chloro-4,5-dihydro-10H-benzo[a]thieno[2,3-d]cyclohepten-4-one and 5.76 g (0.15 mole) of sodium borohydride there is obtained, analogously to Example 3 (h), crude 7-chloro-5,10-dihydro-4H-benzo[5,6]cyclohepta[1,2-b]thiophen-4-ol, which is recrystallised from benzene/petroleum ether, M.P.: 109°–112°.

l. From 10 g (0.039 mole) of 7-chloro-5,10-dihydro-4H-benzo[5,6]cyclohepta[1,2-b]thiophen-4-ol there is obtained, analogously to Example 3 (i), by saturation with hydrogen chloride gas, an oil, which is advantageously quickly further processed as crude product, this product being 4,7-dichloro-5,10-dihydro-4H-benzo[5,6]cyclohepta[1,2-b]thiophen.

I claim:

1. A therapeutic preparation comprising a central nervous system depressantly effective amount of a compound of the formula I

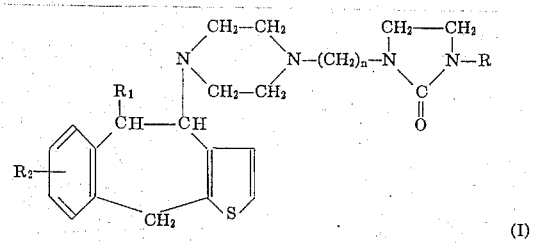

(I)

wherein

R is a lower alkyl group having 1 to 4 carbon atoms, $R_1$ is hydrogen or the methyl group, $R_2$ is hydrogen, halogen up to atomic number 35, trifluoromethyl, a lower alkyl or alkoxy group having 1 to 4 carbon atoms, or a di-lower alkylsulphamoyl group of which the lower alkyl groups each have 1 to 4 carbon atoms, and n is 2 or 3 or a pharmaceutically acceptable salt thereof, in combination with a pharmaceutical excipient.

2. A therapeutic preparation as claimed in claim 1, wherein the compound is 1-[2-[4-(5,10-dihydro-4H-benzo[5,6]cyclohepta[1,2-b]thien-4-yl)-piperazinyl]-ethyl]-3-methyl-2-imidazolidinone or a pharmaceutically acceptable acid addition salt thereof.

3. A therapeutic preparation as claimed in claim 1, wherein the compound is 1-[2-[4-(5,10-dihydro-4H-benzo[5,6]cyclohepta[1,2-b]thien-4-yl)-piperazinyl]-ethyl]-3-isopropyl-2-imidazolidinone or a pharmaceutically acceptable acid addition salt thereof.

4. A method of producing a central nervous system depressant effect on warm-blooded animals comprising the oral, rectal or parenteral administration of a central nervous system depressantly effective amount of a compound according to claim 1 or a pharmaceutically acceptable salt thereof.

* * * * *